July 31, 1928. 1,678,986
J. F. LAWSON
ELECTRIC WELDING
Original Filed June 10, 1924
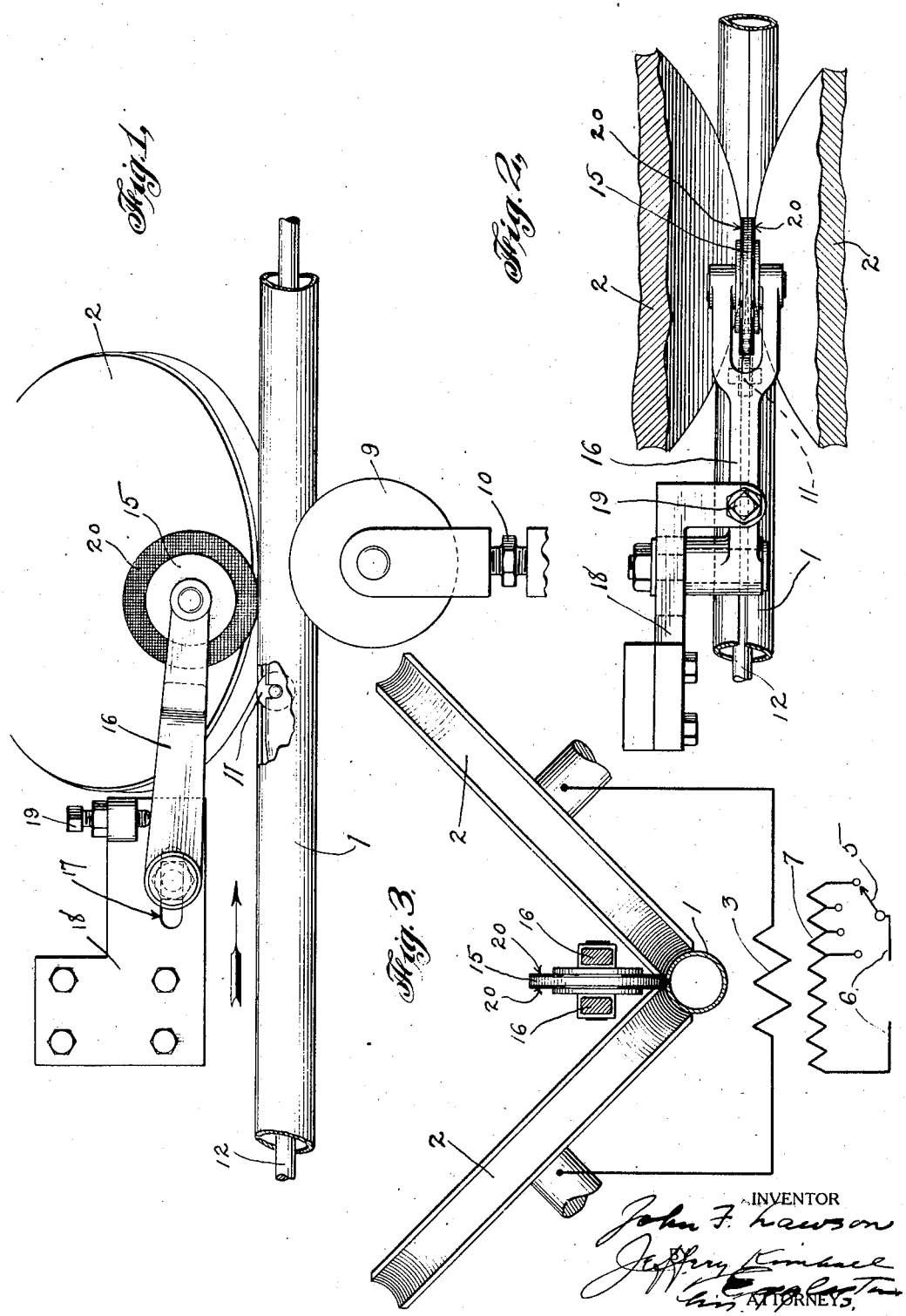

Patented July 31, 1928.

1,678,986

UNITED STATES PATENT OFFICE.

JOHN F. LAWSON, OF BROOKLYN, NEW YORK.

ELECTRIC WELDING.

Application filed June 10, 1924, Serial No. 719,028. Renewed April 6, 1926.

My invention relates to the welding of long seams by the electric resistance method and particularly to the manufacture of pipe by this method. As this method has been practiced heretofore, two roller electrodes bear on the metal on the opposite sides of the seam, and as the seam is moved lengthwise an alternating current is caused to flow between the electrodes and thereby cross the seam. This raises the seam metal to a welding temperature and the weld is completed by pressure.

As this method has usually been practiced, there is a tendency for the weld to become intermittent in character as the speed of the pipe or other article is increased; that is to say, the seam edges tend to weld only in spots which are separated by more or less completely unwelded areas. This may be due to an arc at or near the point where the seam edges are progressively brought together. One of the objects of the present invention is to improve the product at the higher speeds by eliminating the tendency of the weld to become intermittent in character as the speed is increased, whatever the cause of the intermittency may be, and/or to readily produce continuous uninterrupted welds at the higher speeds. Another object is to smooth out or eliminate the burr, which is usually thrown out along the line of the seam, and a still further object is to eliminate the arc in the seam crevice at or near the point where the seam edges are initially brought together in machines of the type herein illustrated when the present invention is not employed. In the present instance, in brief, I accomplish these objects by causing the current to cross the seam in a path so wide in advance of the point where the welding is completed, that the seam metal is highly heated for a distance in advance of that point greater than the distance the tube travels during the time taken for a single impulse of current to flow across the seam, and in conjunction therewith causing the seam edges to be brought together so far in advance of the point where the welding is completed that no arc is formed in the crevice.

The accompanying drawings illustrate a pipe welding machine embodying my invention and operable in accordance with the method outlined. Fig. 1 is an elevation of the essential elements of the machine, one of the roller electrodes being omitted. Fig. 2 is a plan view of Fig. 1 both electrodes being illustrated in section however. Fig. 3 is a sectional view of Fig. 1, looking in the direction of the arrow in Fig. 1, the electrodes being shown in elevation however, and the electrical connections being shown in line diagram.

In accordance with the present practice, narrow strip metal is folded or formed into pipe shape 1, with its edges substantially abutting, and passed lengthwise underneath the roller electrodes 2 with the seam of the pipe intermediate the electrodes. The arrow in Fig. 1 indicates the direction of pipe travel. Alternating current is furnished to the electrodes by the secondary or high current winding 3 of the welding transformer (Fig. 3), and the volume of current is usually adjustable within the reach of the operator, for example, by means of a switch arm 5 through which the operator can connect the incoming supply lines 6 across different numbers of turns of the primary winding 7 of the transformer as indicated. A pressure roll or rolls 9 (which with the electrodes substantially circumscribe and confine the pipe), causes pressure to be put on the heated edges to effect the weld when they have been heated by the current flowing between the electrodes and thereby crossing the seam. I customarily place the axes of the pressure roller or rollers 9 in a vertical plane which is from about one-eighth to one-quarter of an inch to the rear of the vertical plane containing the axes of the electrode rollers 2, that is to say, on the exit side of the plane of the electrode rollers. The fore and aft position of the pressure roller seems to be variable without effect on the welding operation however. It may be assumed that the electrode rollers 2 are adjustable to and from the pipe, and such an adjustment for the pressure roller 9 is indicated at 10. Since the electrodes 2 are rollers they contact with the pipe at any instant over, and the welding current therefore enters and leaves the pipe through, only a relatively short length of pipe. I also usually use a small internal roller 11 to elevate the unwelded seam edges slightly and space them at a more or less fixed distance apart. The face or edge of this roller is convex and it is placed shortly (about four or four and one-half inches) in advance of the contact of the pipe with the electrodes. This aids the other rollers to bring the edges into firm and regular contact with each other. The internal roll 11 may be held in place by a mandrel or rod 12 reaching into the tube from any convenient support. The electrode rolls 2, it will be observed, are separated angularly a considerable distance; 90° in the present instance (Fig. 3). Also, each electrode spans a considerable part of the tube circumference, also nearly 90° in the present instance (Fig. 3). By these means I cause the current path to be a relatively wide one and enable the current to cross the seam in large volume at considerable distances in advance of the vertical plane containing the axes of the electrodes 2, so that when the seam edges are normally or usually brought into initial firm current-carrying contact at a point, say one-half inch in advance of that vertical plane, and the total current volume is sufficient, the metal at the seam edges is heated to incandescence at this remote point of initial contact of the seam edges and an arc exists in the seam crevice at or near that point as before stated. One-half inch, the distance of the normal or usual initial contact of the seam edges with each other in advance of the vertical plane containing the electrode axes, is the distance, it will be observed, that the tube travels while five current impulses are crossing the seam at the commercial frequency of sixty cycles per second and a tube speed of sixty feet per minute. Such a wide distribution of the current is desirable of course in order that the effects of the intermittent impulsive applications of the heating current may overlap thoroughly and equalize the welding temperatures, lengthwise of the seam as much as possible.

To eliminate the arc in the seam crevice, which is the natural result of equalizing the temperatures lengthwise of the seam by extending the current path in large volume well in advance of the vertical plane containing the electrode axes, and to accomplish the other objects of my invention, I cause the seam edges to be brought into firm contact so far in advance of the vertical plane containing the axes of the electrodes that the spreading current is unable to maintain an arc in the seam crevice in advance of the point of initial contact, although its spread is sufficient to substantially equalize the welding temperature lengthwise of the seam and/or produce a uniform uninterrupted union of the seam. This may be accomplished in various ways. The drawings illustrate the means which, up to the present, I have found best adapted for this purpose. This means comprises an additional roller 15 to bear down on the seam edges close to but somewhat in advance of the vertical plane containing the axes of the electrode rollers. This roller must, of course, be narrow enough to enter the space between the electrode rollers, and at the same time its working edge or face must be wide enough to span the seam cleft (Fig. 3), so as to force both edges of the seam downwardly and thereby into contact with each other in advance of the usual point of initial contact. The exact position of this roll 15 may be found by correlation with the other variable elements of an electric welding machine in the same manner as the pressure of the rolls on the tube, the current volume, and the speed of the tube travel are experimentally found and correlated with each other in the common practice of electric tube welding. For this purpose, the hanger 16 of the added roll 15 is adjustable lengthwise of the seam by means of the bolt and slot 17 in the bracket 18 attached to any suitable support. The pressure with which the roll 15 bears on the tube is also preferably made adjustable as by means of the bolt 19 threaded into the bracket 18 and bearing against the hanger 16 as shown. However, so far as I have been able to determine, the proper point of contact of the roll 15 with the tube 1 is at the point where the arc, above described, usually forms in the seam crevice. By thus causing the seam edges to come into firm current-carrying contact so far in advance of the point where an arc can be maintained in a seam crevice, it is possible, I find, to readily produce continuous uninterrupted welds or unions lengthwise of the seam at relatively high speeds. It will be understood of course that the pressure of the rolls, their positioning, the speed of tube travel and the current volume are to be correlated to each other in the same manner as heretofore. And I may mention that bringing the seam edges into contact farther in advance than usual, or at least the use of the roll 15 illustrated, requires considerably larger current to produce welding than has heretofore been employed. It may also be observed that only a very limited space is available for the roller 15 between the electrodes 2. At the same time, the roller 15 should not make electrical contact with either or both of the electrodes 2. It is necessary therefore, for uniformity of results, that the supporting mechanism for the roller 15 be adequate to maintain it in its midway position and out of contact with the electrodes. To further prevent accidental electrical contact of the roller 15 with the electrodes 2, I usually apply a ring of insulating material, such as a heavy cloth, to the side faces of the roll 15, as indicated by the hatching near the circumference of this roll in Fig. 1, and darkened faces in Figs. 2 and 3. The voltage between the electrodes 2 is very low of course so that substantially any insulating material that has the requisite mechanical strength and wearing qualities is suitable.

It will be understood that while I have illustrated and described herein the best form of my invention, of which I am aware, that my invention is not limited thereto but is set forth in the following claims:

1. The method of welding a long seam which consists in passing a current from an extraneous source through the work and across the seam to heat the edges thereof while pressure is applied progressively along the seam to complete the weld, the current being passed into and from the work through comparatively short lengths of the work, and being passed across the seam in sufficient volume so far in advance of the point where the weld is completed that an arc may be formed in the seam crevice if the crevice is open at a point in advance of the point where the weld is completed a distance equal to the distance the tube travels in the time taken for a plurality of current impulses to cross the seam, characterized by causing the seam to close so far in advance of the said point where the weld is completed that no arc is maintained in the seam crevice.

2. The method of butt-welding a long seam which consists in passing a current from an extraneous source through the work and across the seam to heat the edges thereof while applying pressure progressively along the seam to complete the weld, the current being passed into and from the work through comparatively short lengths of the work, characterized by causing the current path to be so wide at the seam and the current to cross the seam in such volume so far in advance of the point where the weld is completed that the welding temperature is substantially equalized lengthwise of the seam, and by causing the seam edges to be progressively brought into firm contact so far in advance of said point where the weld is completed that no arc is maintained in the seam crevice.

3. In an electric seam welder, the combination of a pair of roller electrodes to pass a current across the seam, pressure means cooperating therewith to complete the weld, and additional means to cause the seam to close in advance of the electrodes, the seam being maintained closed after passing said additional means.

4. In an electric butt seam welder, the combination of the electrode and cooperating pressure rollers, and means to cause the seam edges to be brought progressively into initial current-carrying contact at a point in advance of the point where the seam may be closed by the electrode and pressure rolls alone, the seam being maintained closed from said point of initial contact to the point where the welding is progressively completed.

5. In an electric seam welder, the combination of the electrode and pressure rolls, means to elevate the seam edges in advance of the electrode rolls, and means to cause the seam edges to be brought into current-carrying contact in advance of the point where the seam may be closed by the electrode and pressure rolls when unassisted by the last mentioned means.

6. In an electric butt seam welder for pipes, the combination of the electrode rolls and the pressure rolls, and another roll pressing on both edges of the seam, radially of the pipe, near the vertical plane containing the electrode axes.

7. In an electric butt seam welder for pipes, the combination of the electrode and pressure rolls, a roll to elevate the seam edges in advance of the electrode rolls, and a member pressing on the edges of the seam, radially of the pipe, near the vertical plane containing the electrode axes.

8. In an electric seam welder, the combination of a pair of electrode rolls to pass a current across the seam, means to move the seam lengthwise between the electrodes, pressure means cooperating with said electrodes to substantially butt the two edges of the seam together and complete the weld, said electrodes and pressure means being adapted to bring the said two edges together progressively in substantially abutted relation at a more or less certain point in advance of the electrodes, and means to act on the seam edges to cause the seam edges to be brought together by said pressure means and electrodes in advance of said point.

9. The method of progressively electric welding a long seam which consists in passing current into and from the work through comparatively short lengths of the work at opposite sides of the seam, exerting welding pressure locally on the seam adjacent the zone of said current, passing the seam lengthwise through the zones of said current and said pressure to weld the same progressively, and working on the seam edges to cause the seam edges to be brought together at an added distance in advance of the point where the welding is done.

10. The method of butt-welding a long seam which consists in passing a current into and from the work through relatively short lengths of the work and across the seam to heat the edges thereof progressively while applying pressure progressively along the seam to complete the weld, and preventing the formation of an arc between the approaching edges to be welded.

11. The method of butt-welding a long seam which consists in passing a current into and from the work through relatively short lengths of the work and across the seam to heat the edges thereof progressively while applying pressure progressively along the seam to complete the weld, characterized by bringing the edges together far enough in advance of the electrode contact to prevent the formation of the usual arc between such edges.

12. The method of butt-welding a long seam which consists in passing a current into and from the work through relatively short lengths of the work and across the seam to heat the edges thereof progressively while applying pressure progressively along the seam to complete the weld, and preventing arc-burning of the edges as they approach the electrodes.

13. The method of butt-welding a long seam which consists in passing a current into and from the work through relatively short lengths of the work and across the seam to heat the edges thereof progressively while applying pressure progressively along the seam to complete the weld, and causing the seam to close so far in advance of the electrodes that arc-burning of the seam edges is prevented.

In testimony whereof, I have signed this specification.

JOHN F. LAWSON.